United States Patent
Lee (10) Patent No.: US 11,204,258 B2
(45) Date of Patent: Dec. 21, 2021

(54) APPARATUS FOR SENSING ROTATING DEVICE

(71) Applicant: Samsung Electro-Mechanics Co., Ltd., Suwon-si (KR)

(72) Inventor: Jong Woo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 357 days.

(21) Appl. No.: 16/419,220

(22) Filed: May 22, 2019

(65) Prior Publication Data
US 2020/0088544 A1   Mar. 19, 2020

(30) Foreign Application Priority Data

Sep. 14, 2018  (KR) .................. 10-2018-0110441
Nov. 19, 2018  (KR) .................. 10-2018-0142813

(51) Int. Cl.
*G01D 1/16* (2006.01)
*G01D 5/245* (2006.01)
*G01B 7/30* (2006.01)

(52) U.S. Cl.
CPC ............. *G01D 1/16* (2013.01); *G01D 5/2451* (2013.01); *G01B 7/30* (2013.01)

(58) Field of Classification Search
CPC . G01B 7/30; G01B 11/00; G01D 1/16; G01D 2205/77; G01D 5/2451; G01D 2205/771; G01D 5/145
USPC ......... 702/41, 104, 141, 145, 150, 151, 155, 702/188–189
See application file for complete search history.

(56) References Cited

U.S. PATENT DOCUMENTS

| 4,449,191 A * | 5/1984 | Mehnert ................ G01D 5/247 702/94 |
| 2012/0227514 A1* | 9/2012 | Ueda ...................... G01D 5/145 73/862.325 |
| 2014/0360804 A1* | 12/2014 | Oguchi .................... G01L 3/12 180/446 |
| 2015/0153154 A1* | 6/2015 | Nishi ................... G01D 5/2451 382/203 |
| 2016/0209241 A1* | 7/2016 | Mitsuhashi ........ G01D 5/34715 |
| 2017/0167891 A1* | 6/2017 | Maeda ..................... G01D 5/14 |
| 2018/0259366 A1* | 9/2018 | Moriyama ........... G01D 5/2451 |
| 2018/0361766 A1* | 12/2018 | Shirato ................. B41J 25/001 |

FOREIGN PATENT DOCUMENTS

| JP | 2009-128312 A | 6/2009 |
| JP | 2015-105844 A | 6/2015 |

* cited by examiner

*Primary Examiner* — John E Breene
*Assistant Examiner* — Jeffrey P Aiello
(74) *Attorney, Agent, or Firm* — NSIP Law (57) ABSTRACT

An apparatus for sensing a rotating body includes a unit to be detected, including a first pattern portion having at least one first pattern and a second pattern portion having at least one second pattern, and configured to rotate around a rotating shaft, a sensor module comprising a first sensor disposed opposite to the first pattern portion and a second sensor disposed opposite to the second pattern portion, and a rotation information calculator configured to calculate a difference value by differentiating output signals of the first sensor and the second sensor, and to compare comparison values, determined according to a target sensing angle and a size of the first pattern and the second pattern, with the difference value.

17 Claims, 8 Drawing Sheets

APPARATUS FOR SENSING ROTATING DEVICE

CROSS-REFERENCE TO RELATED APPLICATION(S)

This application claims the benefit under 35 U.S.C. § 119(a) of Korean Patent Application Nos. 10-2018-0110441 filed on Sep. 14, 2018 and 10-2018-0142813 filed on Nov. 19, 2018 in the Korean Intellectual Property Office, the entire disclosures of which are incorporated herein by reference for all purposes.

BACKGROUND

1. Field

The present disclosure relates to an apparatus for sensing a rotating body.

2. Description Of Related Art

A rotating body is applied to various fields such as, for example, a motor, a wheel switch of a wearable device, and is preferred in a miniature form with a slim profile. A sensing circuit for detecting a position of a rotating body detects a minute displacement of the rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect there is disclosed an apparatus for sensing a rotating body, including a unit to be detected comprising a first pattern portion having at least one first pattern and a second pattern portion having at least one second pattern, and configured to rotate around a rotating shaft, a sensor module comprising a first sensor disposed opposite to the first pattern portion and a second sensor disposed opposite to the second pattern portion, and a rotation information calculator configured to calculate a difference value by differentiating output signals of the first sensor and the second sensor, and to compare comparison values, determined according to a target sensing angle and a size of the first pattern and the second pattern, with the difference value.

The rotation information calculator may be configured to vary a number and a level of the comparison values according to the target sensing angle.

The number of the comparison values may be determined according to a ratio of an angle, corresponding to a size of the first pattern and the second pattern, and the target sensing angle.

The of the comparison values may be determined to divide the angle, corresponding to the size of the first pattern and the second pattern, by the target sensing angle.

The at least one first pattern and the at least one second pattern may be arranged to have an angle difference.

The comparison values may be within a range of a maximum value and a minimum value of the difference value.

A difference between two adjacent comparison values, among the comparison values, may correspond to twice a difference between a maximum comparison value, adjacent to the maximum value, and the maximum value, or a difference between a minimum comparison value, adjacent to the minimum value, and the minimum value.

The at least one first pattern and the at least one second pattern may have an angle difference corresponding to half of a size of the first pattern and the second pattern.

The first sensor and the second sensor may have a size corresponding to half of a size of the first pattern and the second pattern.

According to another aspect there is disclosed an apparatus for sensing a rotating body, including a unit to be detected comprising a first pattern portion having at least one first pattern and a second pattern portion having at least one second pattern, and configured to rotate around a rotating shaft, a sensor module comprising a first sensor disposed opposite to the first pattern portion and a second sensor disposed opposite to the second pattern portion, and a rotation information calculator configured to calculate a difference value by differentiating output signals of the first sensor and the second sensor, and to compare comparison values, varied according to a target sensing angle, with the difference value.

The rotation information calculator may be configured to determine a number and a level of the comparison values according to the target sensing angle.

The number of the comparison values may be determined according to a ratio of an angle, corresponding to a size of the first pattern and the second pattern, and the target sensing angle.

The level of the comparison values may be determined to divide an angle, corresponding to a size of the first pattern and the second pattern, by the target sensing angle.

The rotation information calculator may be configured to compare the difference value with the comparison values to calculate an output value, and the output value may be switched between states at a high level and a low level, at a time point at which a level of the difference value is equal to a level of each of the comparison values.

A reference value having a different sign may be applied to each of the comparison values, according to increasing and decreasing states of the difference value.

A reference value having a positive sign may be applied to any one comparison value among the comparison values, in an increasing state of the difference value, and a reference value having a negative sign may be applied to the any one comparison value in a decreasing state of the difference value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on,", "connected to,", or "coupled to", another element, it can be directly "on,", "connected to,", or "coupled to", the other element or other elements intervening therebetween may be present. When an element is referred to as being "directly on,", "directly connected to,", or "directly coupled to", another element, there may be no elements or layers intervening therebetween. Like numerals refer to like elements throughout.

The terminology used herein is for describing various examples only, and is not to be used to limit the disclosure. As used herein, the term "and/or", includes any and all combinations of one or more of the associated listed items.

The use of the term "may", with respect to an example or embodiment, e.g., as to what an example or embodiment may include or implement, means that at least one example or embodiment exists in which such a feature is included or implemented while all examples and embodiments are not limited thereto.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above,", "upper,", "below,", and "lower", and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above,", or "upper", other elements would then be oriented "below,", or "lower", the other elements or features. Thus, the term "above", can encompass both the above and below orientations depending on a particular direction of the figures. The device may be otherwise oriented (rotated 90 degrees or at other orientations) and the spatially relative descriptors used herein may be interpreted accordingly.

As used herein, the singular forms "a,", "an,", and "the", are intended to include the plural forms as well, unless the context clearly indicates otherwise. It will be further understood that the terms "comprises,", and/or "comprising", when used in this specification, specify the presence of stated features, integers, steps, operations, members, elements, and/or groups thereof, but do not preclude the presence or addition of one or more other features, integers, steps, operations, members, elements, and/or groups thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The contents of the present disclosure described below may have a variety of configurations and propose only a required configuration herein, but are not limited thereto.

Figure 1:
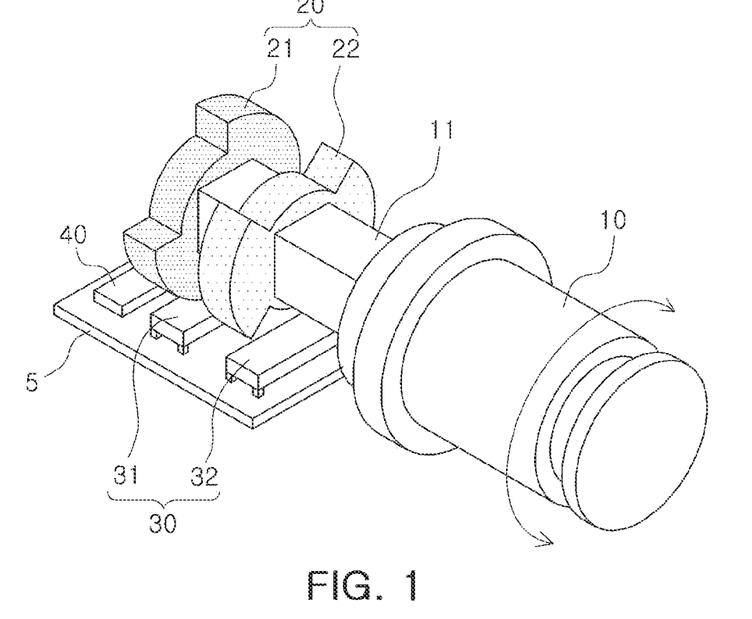
FIG. 1 is a diagram illustrating an example of an apparatus for sensing a rotating body.

FIG. 1 is a diagram illustrating an example of an apparatus for sensing a rotating body.

The apparatus for sensing a rotating body according to an embodiment may include a unit to be detected 20, a sensor module 30, and a rotation information calculator 40, and may further include a substrate 5.

The unit to be detected 20 may be connected to a wheel 10, through a rotating shaft 11. The wheel 10 may be a rotating body in an electronic device and be rotated clockwise or counterclockwise by a user. The unit to be detected 20 may rotate together with the wheel 10 either clockwise or counterclockwise.

The unit to be detected 20 may include a first pattern portion 21 and a second pattern portion 22. In an example, the first pattern portion 21 and the second pattern portion 22 have the same shape, are spaced apart from each other by a distance in an extending direction of the rotating shaft 11. In an example, the first pattern portion 21 and the second pattern portion 22 may be combined with the rotating shaft 11. The first pattern portion 21 and the second pattern portion 22 may rotate in the same direction and at the same speed by the rotating shaft.

Each of the first pattern portion 21 and the second pattern portion 22 may include at least one pattern having the same shape. The first pattern portion 21 includes at least one first pattern, and the second pattern portion 22 includes at least one second pattern.

In FIG. 1, a protruding region of each of the first pattern portion 21 and the second pattern portion 22 corresponds to a pattern. In an example, a disk-type metal and magnetic material is processed, and a sawtooth is formed to manufacture the first pattern of the first pattern portion 21 and the second pattern of the second pattern portion 22. Thus, the first pattern of the first pattern portion 21 and the second pattern of the second pattern portion 22 may be formed of one from among a metal and a magnetic material.

The first pattern of the first pattern portion 21 is extended in the direction of rotation, and the second pattern of the second pattern portion 22 is extended in the direction of rotation. An extension length of the first pattern portion 21 in a rotation direction of the first pattern may be defined as a size of a first pattern, and an extension length of the second pattern portion 22 in a rotation direction of the second pattern may be defined as a size of a second pattern.

When the first pattern portion 21 includes one first pattern, and the second pattern portion 22 includes one second pattern, the one first pattern and the one second pattern may have a size corresponding to a rotation angle of 180°.

Assuming that the first pattern portion 21 includes a plurality of first patterns, and the second pattern portion 22 includes a plurality of second patterns, the first patterns of the first pattern portion 21 are spaced apart from each other by a distance in a rotation direction. Likewise, the second patterns of the second pattern portion 22 are spaced apart from each other by a distance in a rotation direction. As an example, a separation distance of the first patterns of the first pattern portion 21 may be the same as a size of a first pattern, and a separation distance of the second patterns of the second pattern portion 22 may be the same as a size of a second pattern.

As an example, the first patterns of the first pattern portion 21 may have a size corresponding to a rotation angle of 90°, and a separation distance between the first patterns may correspond to a rotation angle of 90°. Thus, the first pattern portion 21 may have two first patterns having a size of 90°. In a similar manner, the second patterns of the second pattern portion 22 may have a size corresponding to a rotation angle of 90°, and a separation distance between the second patterns may correspond to a rotation angle of 90°. Thus, the second pattern portion 22 may have two second patterns having a size of 90°.

In an example, a size and the number of first patterns and second patterns may be changed. As an example, the first pattern portion 21 may have three first patterns having a size of 60°, and the second pattern portion 22 may have three second patterns having a size of 60°.

Hereinafter, for convenience of explanation, it is assumed that the first pattern portion 21 has two first patterns having a size of 90°, and the second pattern portion 22 has two second patterns having a size of 90°. However, pattern portion having patterns in various angle sizes and various numbers are considered to be well within the scope of the present disclosure.

The first patterns of the first pattern portion 21 and the second patterns of the second pattern portion 22 may be disposed to have an angle difference. As an example, the first patterns of the first pattern portion 21 and the second patterns of the second pattern portion 22 may be disposed to have an angle difference corresponding to half of a size of a first pattern and half of a size of a second pattern.

When it is assumed that the first pattern portion 21 has two first patterns having a size of 90° and the second pattern portion 22 has two second patterns having a size of 90°, the first patterns of the first pattern portion 21 and the second patterns of the second pattern portion 22 may be disposed to have an angle difference of 45°. Thus, some regions of the first patterns of the first pattern portion 21 and the second patterns of the second pattern portion 22 may overlap in a direction in which the rotating shaft 11 is extended.

The sensor module 30 may include a plurality of sensor. As an example, the sensor module 30 may include a first sensor 31 and a second sensor 32. The first sensor 31 and the second sensor 32 are disposed in an extending direction of the rotating shaft 11. The first sensor 31 is disposed opposite to the first pattern portion 21, and the second sensor 32 is disposed opposite to the second pattern portion 22.

According to rotation of the first pattern portion 21, an area of the first sensor 31 that is overlapped with a first pattern of the first pattern portion 21 is changed. Likewise, According to rotation of the second pattern portion 22, and an area of the second sensor 32 that is overlapped with a second pattern of the second pattern portion 22 is changed. In an example, the first sensor 31 and the second sensor 32 detect a change in an overlapping area with the first pattern portion 21 and the second pattern portion 22.

In an example, the first sensor 31 and the second sensor 32 have a size that is defined. Sizes of the first sensor 31 and the second sensor 32 may be understood as a length corresponding to a direction in which a rotating body rotates. In an example, the sizes of the first sensor 31 and the second sensor 32 may correspond to half of a first pattern of the first pattern portion 21 and a second pattern of the second pattern portion 22.

In an example, each of the first sensor 31 and the second sensor 32 may include a sensing coil. In an example, the sensing coil forms a circuit pattern on a substrate 5, and may be provided in the substrate 5. In an example, the sensing coil may be provided as one of a winding inductor coil and a solenoid coil. The first sensor 31 and the second sensor 32, provided as the sensing coil, may detect a rotation angle of a rotating body, according to inductance changed depending on an area overlapped with the first pattern portion 21 and the second pattern portion 22, respectively.

The rotation information calculator 40 is configured as an integrated circuit and mounted on the substrate 5, and the rotation information calculator 40 may be electrically connected to the first sensor 31 and the second sensor 32. The rotation information calculator 40 may calculate rotation information including at least one among a rotation direction, a rotation angle, and an angular velocity of a rotating body depending on a change in inductance of the first sensor 31 and the second sensor 32.

Figure 2:
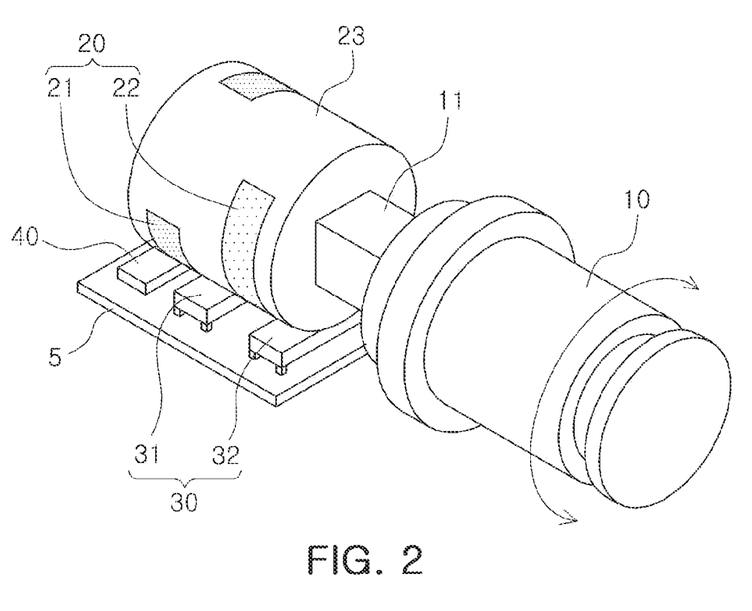
FIG. 2 is a diagram illustrating an example of an apparatus for sensing a rotating body.

FIG. 2 is a diagram illustrating an example of an apparatus for sensing a rotating body. An apparatus for sensing a rotating body according to FIG. 2 is similar to an apparatus for sensing a rotating body according to an embodiment of FIG. 1, so duplicate descriptions may be omitted. In addition to the description of FIG. 2 below, the descriptions of FIG. 1 are also applicable to FIG. 2, and are incorporated herein by reference. Thus, the above description may not be repeated here Referring to FIG. 2, an apparatus for sensing a rotating body may further include a supporting member 23 connected to the rotating shaft 11.

The supporting member 23 is connected to the rotating shaft 11, and may rotate clockwise or counterclockwise around the rotating shaft 11 according to rotation of the wheel 10. In an example, the supporting member 23 may be provided to have a cylindrical form. The supporting member 23 may be formed of a nonmetallic material. In an example, the supporting member 23 may be formed of plastic.

A unit to be detected 20 may be disposed in the supporting member 23 having a cylindrical form. The unit to be detected 20 may include a first pattern portion 21 and a second pattern portion 22, disposed on a side surface of the supporting member 23 having a cylindrical form.

The first pattern portion 21 may include first patterns extended in a rotation direction in a first height region of the supporting member 23 having a cylindrical form, and the second pattern portion 22 may include second patterns extended in a rotation direction in a second height region of the supporting member 23 having a cylindrical form.

Here, the first patterns of the first pattern portion 21 and the second patterns of the second pattern portion 22 may be formed of one of a metal and a magnetic material.

The supporting member 23 may be formed of a nonmetallic material such as plastic, and the first pattern portion 21 and the second pattern portion 22 may be formed of a metal. In an example, the supporting member 23 is manufactured through an injection molding process of plastic, and the first pattern portion 21 and the second pattern portion 22 is formed through a plating process.

The first pattern portion 21 and the second pattern portion 22 may be disposed on a side surface of the supporting member 23. When the first pattern portion 21 and the second pattern portion 22 are disposed on the supporting member 23, a groove portion for providing the first pattern portion 21 and the second pattern portion 22 is formed in a side surface of the supporting member 23 having a cylindrical form. As an example, the groove portion may be extended along the rotation direction, for formation of the first pattern portion 21 and the second pattern portion 22. The first pattern portion 21 and the second pattern portion 22 are disposed in the groove portion provided in a side surface of the supporting member 23, to be exposed externally. As an example, a thickness of each of the first pattern portion 21 and the second pattern portion 22 may be the same as a thickness of a groove portion. Thus, a step or indentation may not be generated in a side surface of the supporting member 23 due to the first pattern portion 21 and the second pattern portion 22, provided in the groove portion.

A thin pattern is manufactured using a mass production method such as, for example, an injection molding process or a plating process, so that the apparatus for sensing a rotating body of FIG. 2 may be advantageous for mass production and cost reduction.

Figure 3:
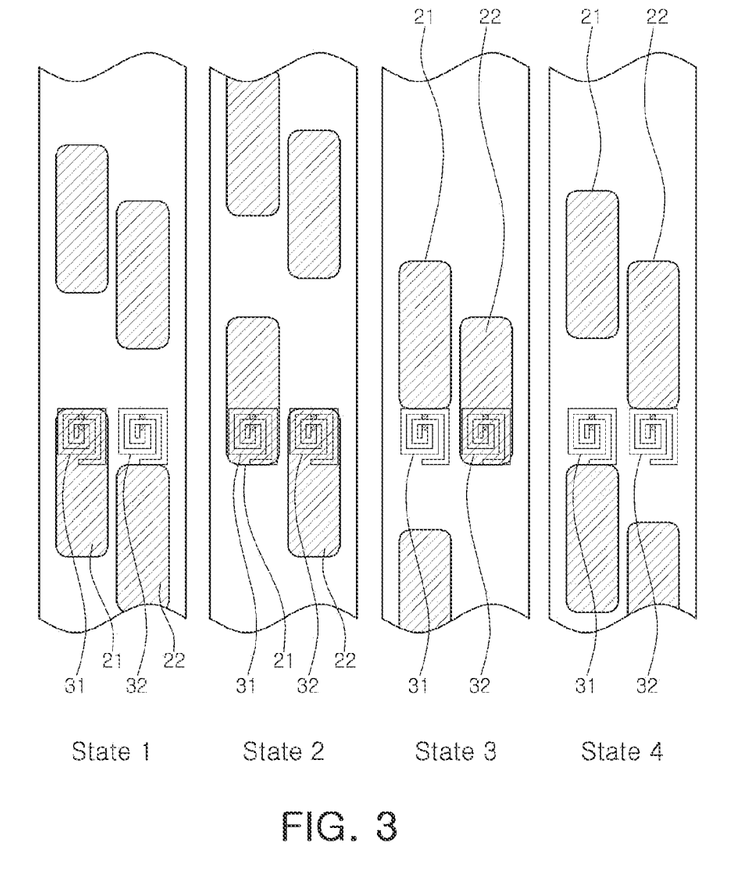
FIG. 3 is a diagram illustrating an example of a positional relationship of a unit to be detected and a sensor module.
Figure 4:
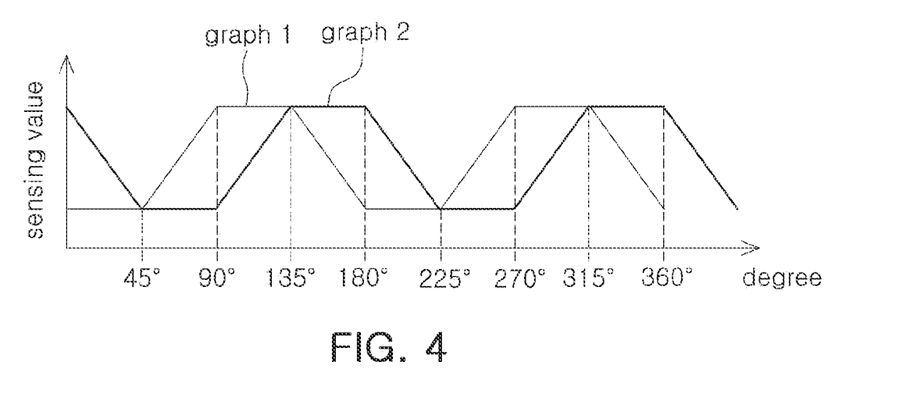
FIG. 4 is a graph illustrating an example of a sensing value measured by a sensor module according to rotation of a unit to be detected.

FIG. 3 is a diagram illustrating examples of a positional relationship of a unit to be detected and a sensor module according to rotation of the unit to be detected. FIG. 4 is a graph illustrating a sensing value measured by a sensor module according to rotation of a unit to be detected. In FIG. 3, in an example, a first sensor 31 and a second sensor 32 are illustrated as a sensing coil.

Referring to FIG. 3, according to rotation of the wheel 10, an overlapping area of the unit to be detected 20 and the sensor module 30 may be changed. In detail, an overlapping area of the first pattern portion 21 and the first sensor 31 and an overlapping area of the second pattern portion 22 and the second sensor 32 may be changed. In FIG. 3, it is assumed that the first pattern portion 21 and the second pattern portion 22 rotate in a direction from a lower side to an upper side.

In a first state State 1, the first sensor 31 is overlapped with the first pattern portion 21, and the second sensor 32 is not overlapped with the second pattern portion 22. When a pattern formed of a metallic material is adjacent to the first sensor 31 including a sensing coil, a current is applied to a pattern by magnetic flux generated in the sensing coil, and magnetic flux is generated from the pattern by the current applied to the pattern. In this case, the magnetic flux, generated in the pattern, cancels the magnetic flux of the sensing coil of the first sensor 31, thereby reducing inductance of the sensing coil of the first sensor 31. Thus, referring to 0° of FIG. 4 corresponding to the first state State 1, inductance (graph 1) of the first sensor 31 is maintained at a low level, while inductance (graph 2) of the second sensor 32 is maintained at a high level.

After the first state State 1, the first pattern portion 21 and the second pattern portion 21 rotate in a direction from a lower side to an upper side. In the second state State 2, the first sensor 31 is overlapped with the first pattern portion 21, and the second sensor 32 is overlapped with the second pattern portion 22. Thus, referring to 45° of FIG. 4 corresponding to the second state State 2, the inductance (graph 1) of the first sensor 31 is maintained at a low level, and the inductance (graph 2) of the second sensor 32 is changed to a high level.

After the second state State 2, the first pattern portion 21 and the second pattern portion 22 rotate in a direction from a lower side to an upper side. In a third state State 3, the first sensor 31 is not overlapped with the first pattern portion 21, and the second sensor 32 is overlapped with the second pattern portion 22. Thus, referring to 90° of FIG. 4 corresponding to the third state State 3, the inductance (graph 1) of the first sensor 31 is changed to a high level, and the inductance (graph 2) of the second sensor 32 is maintained at a low level.

After the third state State 3, the first pattern portion 21 and the second pattern portion 21 rotate in a direction from a lower side to an upper side. Thus, in a fourth state State 4, the first sensor 31 is not overlapped with the first pattern portion 21, and the second sensor 32 is not overlapped with the second pattern portion 22. Thus, referring to 135° of FIG. 4 corresponding to the fourth state State 4, the inductance (graph 1) of the first sensor 31 is maintained at a high level, and the inductance (graph 2) of the second sensor 32 is changed to a high level.

Figure 5:
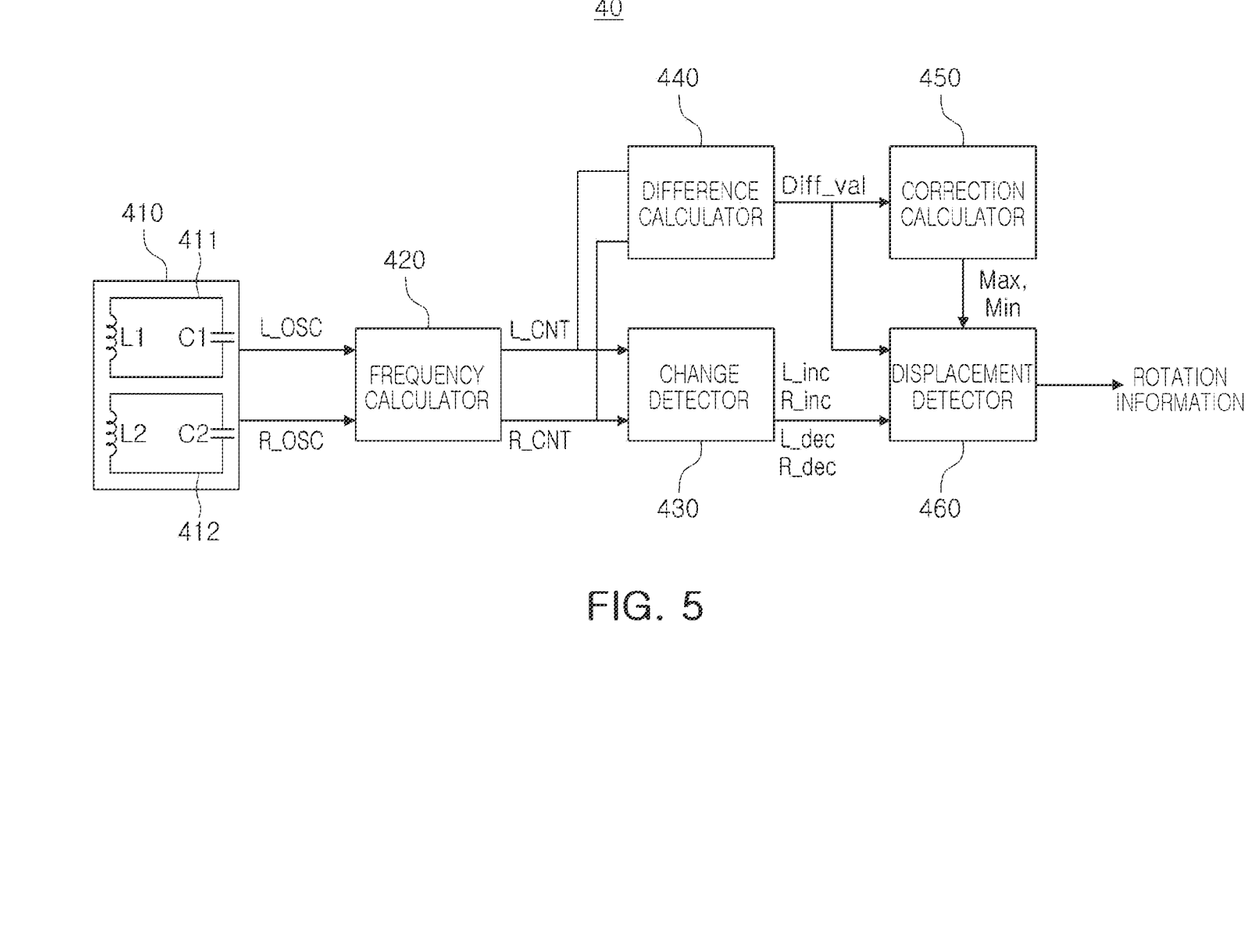
FIG. 5 is a diagram illustrating an example of a rotation information calculator.
Figure 6:
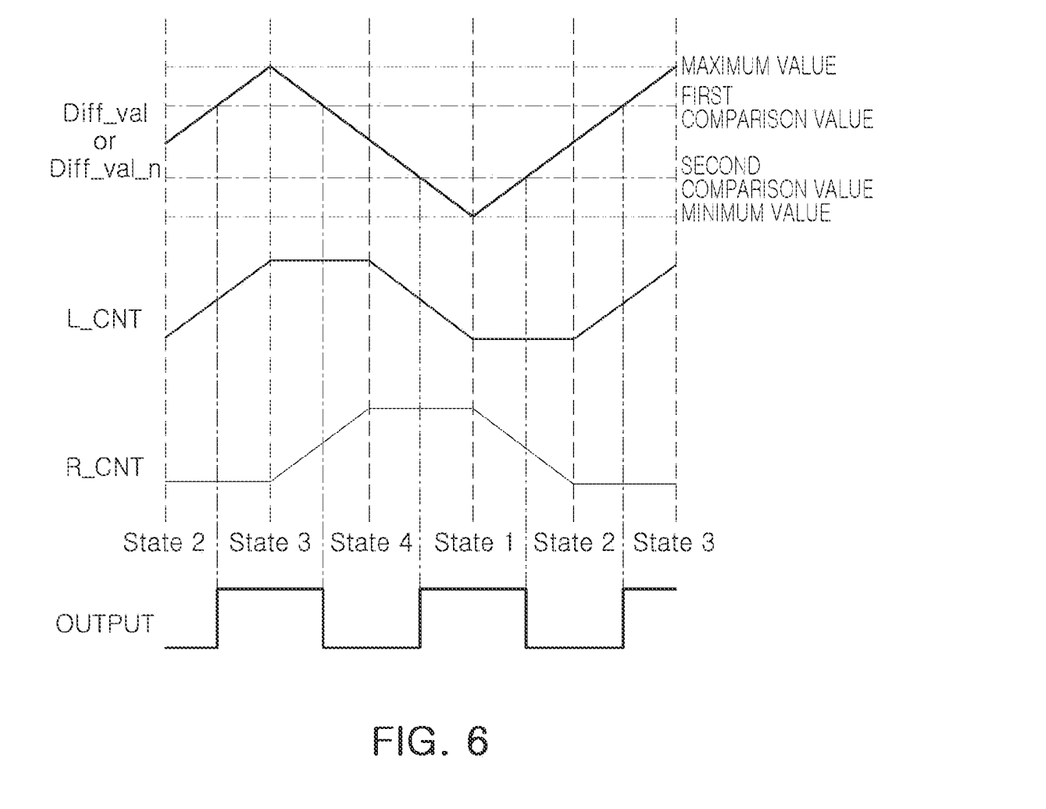
FIG. 6 is a diagram illustrating an example of waveform diagram of a main signal.

FIG. 5 is a diagram illustrating an example of a rotation information calculator, and FIG. 6 is a waveform diagram of a main signal according to an example.

Referring to FIG. 5, a method for sensing a rotating body of an apparatus for sensing a rotating body according to an embodiment will be described in detail.

The rotation information calculator 40 may include an oscillator 410, a frequency calculator 420, a change detector 430, a difference calculator 440, a correction calculator 450, and a displacement detector 460.

In an example, the oscillator 410 includes a first oscillating circuit 411 and a second oscillating circuit 412. The first oscillating circuit 411 may include a first sensing coil L1 and a first capacitor C1, and the second oscillating circuit 412 may include a second sensing coil L2 and a second capacitor C2. In FIG. 6, the first sensing coil L1 and the second sensing coil L2 may correspond to a sensing coil, an embodiment of the first sensor 31 and the second sensor 32 of FIGS. 1 and 2. A pair of a sensing coil and a capacitor may form a LC oscillator. In an example, the oscillating circuit may include various other types of oscillators.

Each of the first oscillating circuit 411 and the second oscillating circuit 412 may output a first oscillation signal L_OSC and a second oscillation signal R_OSC. When an overlapping area of the unit to be detected 20, the first sensing coil, and the second sensing coil is changed by rotation of the wheel 10, frequencies of a first oscillation signal L_OSC and a second oscillation signal R_OSC, output by the first oscillating circuit 411 and the second oscillating circuit 412, may be varied.

The frequency calculator 420 linearizes a change in frequencies of the first oscillation signal L_OSC and the second oscillation signal R_OSC provided from the first oscillating circuit 411 and the second oscillating circuit 412, thereby generating a first count value L_CNT and a second count value R_CNT.

As an example, the frequency calculator 420 counts frequencies of the first oscillation signal L_OSC and the second oscillation signal R_OSC, thereby generating a first count value L_CNT and a second count value R_CNT.

The change detector 430 may detect a change in the first count value L_CNT and the second count value R_CNT. As an example, the change detector 430 may detect a change in a first count value L_CNT and a second count value R_CNT at a reference time interval Δt, thereby generating a first count increase value L_inc, a first count decrease value L_dec, a second count increase value R_inc, and a second count decrease value R_dec.

As an example, the change detector 430 determines a first count increase value L_inc as 1 when the first count value L_CNT is increased, determines a first count decrease value L_dec as 1 when the first count value L_CNT is decreased, determines a second count increase value R_inc as 1 when the second count value R_CNT is increased, and determines a second count decrease value R_dec as 1 when the second count value R_CNT is decreased. In other examples, the first count increase value L_inc, the first count decrease value L_dec, the second count increase value R_inc, and the second count decrease value R_dec are determined as 0.

The difference calculator 440 may calculate a difference value Diff_val by calculating a difference between the first count value L_CNT and the second count value R_CNT. The correction calculator 450 stores a maximum value Max and a minimum value Min of the difference value Diff_val. The difference calculator 440 may calculate a normalized difference value Diff_val_n by normalizing a difference value Diff_val according to a maximum value Max and a minimum value Min of the difference value Diff_val. As an example, when the maximum value Max and the minimum value Min of the difference value Diff_val are normalized to 10 bit, a normalized difference value Diff_val_n may be determined according to the following Equation 1.

$$\text{Diff\_val\_n} = (\text{Diff\_val} - \text{Min}) * 1023 / (\text{Max} - \text{Min}) \quad \text{Equation 1}$$

Hereinafter, for convenience of explanation, an operation of an apparatus for sensing a rotating body will be described in detail based on the difference value Diff_val. Here, the description may be applied to a normalized difference value Diff_val_n.

The correction calculator 450 calculates a plurality of comparison values according to a target sensing angle, and a size of a first pattern and a second pattern, and provides the plurality of comparison values to the displacement detector 460.

In an example, even when the target sensing angle is changed, or a size of a sensing coil/pattern is changed, a plurality of comparison values are calculated according to a determined target sensing angle, and a size of a sensing coil/pattern, and the calculated comparison value and a difference value are compared with each other. Thus, a target sensing angle may be accurately detected.

The plurality of comparison values may be located in a range of a maximum value Max and a minimum value Min of a difference value Diff_val.

Differences between adjacent comparison values, among a plurality of comparison values, may be the same. In an example, a difference between a comparison value having a maximum size, among the plurality of comparison values, and a maximum value Max of a difference value Diff_val may correspond to twice a difference between adjacent comparison values. In an example, a difference between a comparison value having a minimum size, among the plurality of comparison values, and a minimum value Min of the difference value Diff_val may correspond to twice a difference between adjacent comparison values.

The comparison values may be varied according to a target sensing angle, and a size of a first pattern and a second pattern. The number of the comparison values may be determined according to a ratio of an angle corresponding to a size of a first pattern and a second pattern and a target sensing angle, and a level of the comparison values may be determined to divide an angle corresponding to a size of a first pattern and a second pattern by the target sensing angle.

Referring to FIG. 6, two comparison values are illustrated by way of example, and the number of comparison values may be determined according to a target sensing angle and a size of a pattern.

As an example, when an angle of a sensing coil corresponds to 90 degrees, an angle of a pattern corresponds to 180 degrees, and a target sensing angle is 7.5 degrees, 24(=90/7.5*2) comparison values may be calculated. Due to the 24 comparison values, 180 degrees, corresponding to the size of the pattern, may be equally divided by 7.5 degrees, corresponding to the target sensing angle.

Moreover, when the size of the sensing coil corresponds to 45 degrees, the size of the pattern corresponds to 90 degrees, and the target sensing angle is 7.5 degrees, 12(=45/7.5*2) comparison values may be calculated. Due to the 12 comparison values, 90 degrees, corresponding to the size of the pattern, may be equally divided by 7.5 degrees, corresponding to the target sensing angle.

Moreover, when the size of the sensing coil corresponds to 22.5 degrees, the size of the pattern corresponds to 45 degrees, and the target sensing angle is 7.5 degrees, 6(=22.5/7.5*2) comparison values may be calculated. Due to the 6 comparison values, 45 degrees, corresponding to the size of the pattern, may be equally divided by 7.5 degrees, corresponding to the target sensing angle.

Moreover, when the size of the sensing coil corresponds to 7.5 degrees, the size of the pattern corresponds to 15 degrees, and the target sensing angle is 7.5 degrees, 2(=7.5/7.5*2) comparison values may be calculated. Due to the 2 comparison values, 15 degrees, corresponding to the size of the pattern, may be equally divided by 7.5 degrees, corresponding to the target sensing angle.

The displacement detector 460 may calculate a rotation direction of a rotating body, according to a first count increase value L_inc, a first count decrease value L_dec, a second count increase value R_inc, and a second count decrease value R_dec, detected at a time point at which the difference value Diff_val and the plurality of comparison values are compared with each other, and the arrangement relationship of the two sensing coils.

As an example, in FIG. 3, a first sensing coil is disposed on a left side, and a second sensing coil is disposed on a right side. In an example, signals of a first count increase value L_inc, a second count increase value R_inc, a first count decrease value L_dec, and a second count decrease value R_dec is 1000 at one point in time. At a next point in time, the signal is 0100, a rotation direction may be calculated according to the first count increase value L_inc and the second count increase value R_inc.

The displacement detector 460 may calculate a rotation angle of a rotating body, using the difference value Diff_val, output by the difference calculator 440, the maximum value Max and the minimum value Min, stored in the correction calculator 450, and comparison values.

As illustrated in FIG. 3, an overlapping area of first patterns, of a first pattern portion 21, and a first sensor 31 is changed, and an overlapping area of second patterns, of a second pattern portion 22, and a second sensor 32 is changed. In this case, as illustrated in FIG. 6, a first count value L_CNT, a second count value R_CNT, and a difference value Diff_val in a first state State 1 to a fourth state State 4 may be calculated.

The displacement detector 460 may calculate an output value OUTPUT, by comparing the difference value Diff_val with the plurality of comparison values, provided from the correction calculator 450. The displacement detector 460 may calculate the output value OUTPUT, by switching states of the output value OUTPUT, at a time point at which a level of a difference value Diff_val is equal to a level of each of a first comparison value and a second comparison value.

For example, two values, a first comparison value and a second comparison value, are provided from the correction calculator 450, and it is assumed that an output value OUTPUT is at a low level before comparison with the first comparison value. In this case, the displacement detector 460 may calculate the output value OUTPUT, by determining a difference value Diff_val, equal to or greater than the first comparison value, as a high level, a difference value Diff_val, less than the second comparison value, as a high level, and a difference value Diff_val, less than the first comparison value and equal to or greater than the second comparison value, as a low level.

The displacement detector 460 may calculate a rotation angle of a unit to be detected from each of sections at a high level and a low level of the output value OUTPUT. As an example, the displacement detector 460 may calculate a rotation angle from an interval of sections at a high level and a low level of the output value OUTPUT.

FIGS. 7 to 10 are diagrams illustrating examples of waveform diagram of a main signal.

Figure 7:
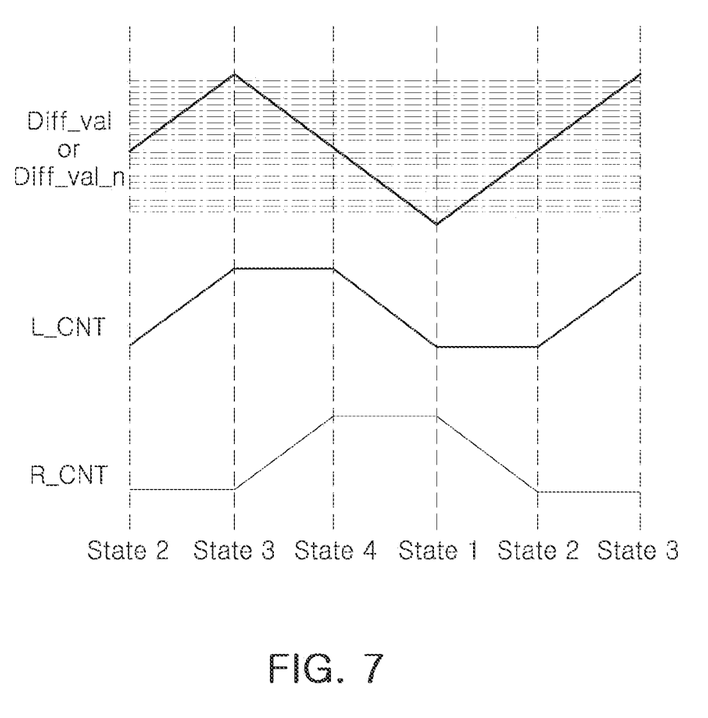
FIGS. 7 to 10 are diagrams illustrating examples of waveform diagrams of a main signal.

FIG. 7 corresponds to an example in which a rotation angle is calculated by 24 (=90/7.5*2) comparison values, when a size of a sensing coil corresponds to 90 degrees, a size of a pattern corresponds to 180 degrees, and a target sensing angle is 7.5 degrees.

Table 1 illustrates 24 comparison values normalized to 10 bit, when a maximum value and a minimum value of a difference value are normalized to 10 bit, a division range, that is, a region divided by the 24 comparison values, and an angle (a degree) measured by the 24 comparison values, among sizes of a pattern corresponding to 180 degrees.

TABLE 1

| Comparison value | 10-bit code value | Division range | Degree |
|---|---|---|---|
| 1 | 21 | 1/48 range | 3.75 |
| 2 | 64 | 3/48 range | 11.25 |
| 3 | 107 | 5/48 range | 18.75 |
| 4 | 149 | 7/48 range | 26.25 |
| 5 | 192 | 9/48 range | 33.75 |
| 6 | 235 | 11/48 range | 41.25 |
| 7 | 277 | 13/48 range | 48.75 |
| 8 | 320 | 15/48 range | 56.25 |
| 9 | 363 | 17/48 range | 63.75 |
| 10 | 405 | 19/48 range | 71.25 |
| 11 | 448 | 21/48 range | 78.75 |
| 12 | 491 | 23/48 range | 86.25 |
| 13 | 533 | 25/48 range | 93.75 |
| 14 | 576 | 27/48 range | 101.25 |
| 15 | 619 | 29/48 range | 108.75 |
| 16 | 661 | 31/48 range | 116.25 |
| 17 | 704 | 33/48 range | 123.75 |
| 18 | 747 | 35/48 range | 131.25 |
| 19 | 789 | 37/48 range | 138.75 |
| 20 | 832 | 39/48 range | 146.25 |

TABLE 1-continued

| Comparison value | 10-bit code value | Division range | Degree |
|---|---|---|---|
| 21 | 875 | 31/48 range | 153.75 |
| 22 | 917 | 43/48 range | 161.25 |
| 23 | 960 | 45/48 range | 168.75 |
| 24 | 1003 | 47/48 range | 176.25 |

Figure 8:
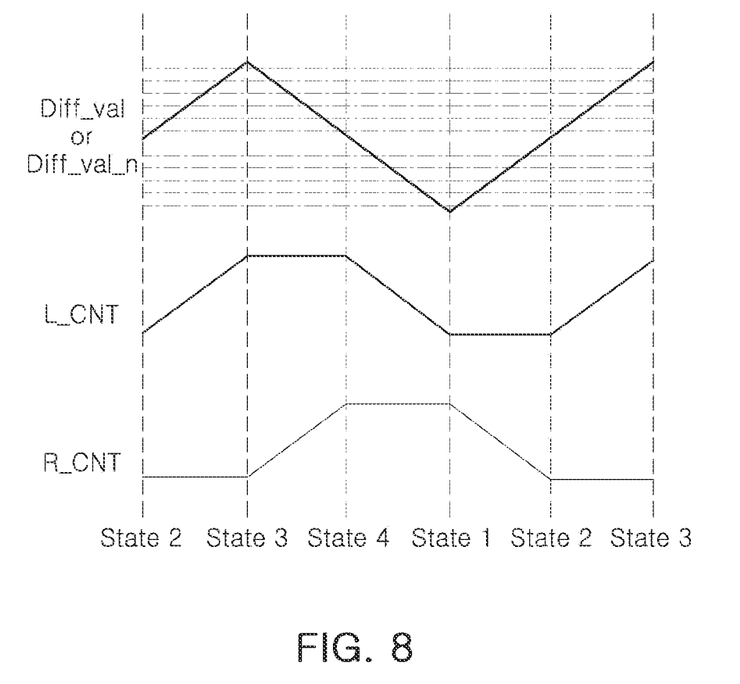

FIG. 8 corresponds to an example in which a rotation angle is calculated by 12(=45/7.5*2) comparison values, when a size of a sensing coil corresponds to 45 degrees, a size of a pattern corresponds to 90 degrees, and a target sensing angle is 7.5 degrees.

Table 2 illustrates 12 comparison values normalized to 10 bit, when a maximum value and a minimum value of a difference value are normalized to 10 bit, a division range, that is, a region divided by the 12 comparison values, and an angle (a degree) measured by the 12 comparison values, among sizes of a pattern corresponding to 90 degrees.

TABLE 2

| Comparison value | 10-bit code value | Division range | Degree |
|---|---|---|---|
| 1 | 42 | 1/24 range | 3.75 |
| 2 | 127 | 3/24 range | 11.25 |
| 3 | 213 | 5/24 range | 18.75 |
| 4 | 298 | 7/24 range | 26.25 |
| 5 | 383 | 9/24 range | 33.75 |
| 6 | 468 | 11/24 range | 41.25 |
| 7 | 554 | 13/24 range | 48.75 |
| 8 | 639 | 15/24 range | 56.25 |
| 9 | 724 | 17/24 range | 63.75 |
| 10 | 809 | 19/24 range | 71.25 |
| 11 | 895 | 21/24 range | 78.75 |
| 12 | 980 | 23/24 range | 86.25 |

Figure 9:
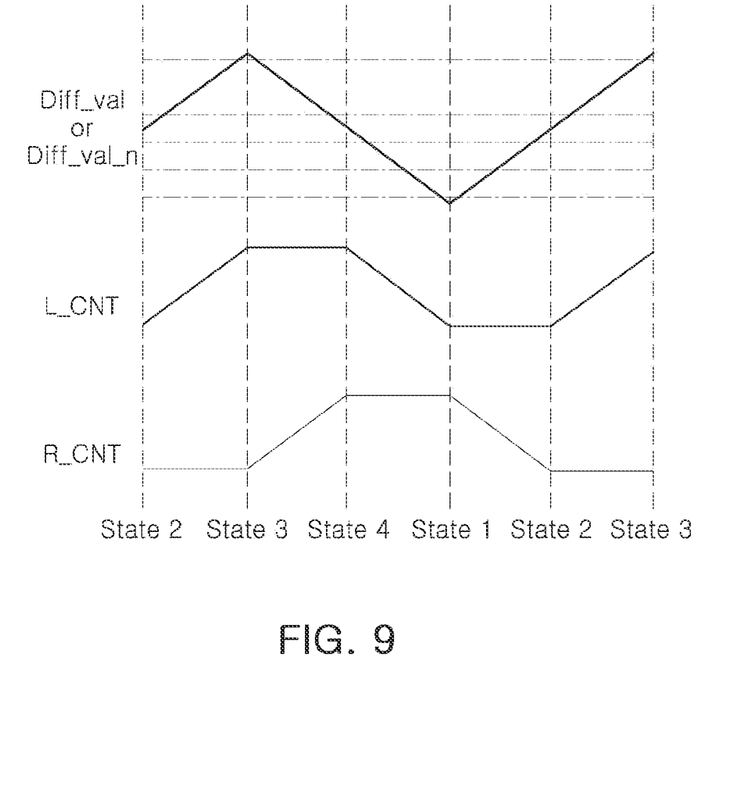

FIG. 9 corresponds to an example in which a rotation angle is calculated by 6 (=22.5/7.5*2) comparison values, when a size of a sensing coil corresponds to 22.5 degrees, a size of a pattern corresponds to 45 degrees, and a target sensing angle is 7.5 degrees.

Table 3 illustrates 6 comparison values normalized to 10 bit, when a maximum value and a minimum value of a difference value are normalized to 10 bit, a division range, that is, a region divided by the 6 comparison values, and an angle (a degree) measured by the 6 comparison values, among sizes of a pattern corresponding to 45 degrees.

TABLE 3

| Comparison value | 10-bit code value | Division range | Degree |
|---|---|---|---|
| 1 | 85 | 1/12 range | 3.75 |
| 2 | 255 | 3/12 range | 11.25 |
| 3 | 426 | 5/12 range | 18.75 |
| 4 | 596 | 7/12 range | 26.25 |
| 5 | 767 | 9/12 range | 33.75 |
| 6 | 937 | 11/12 range | 41.25 |

Figure 10:
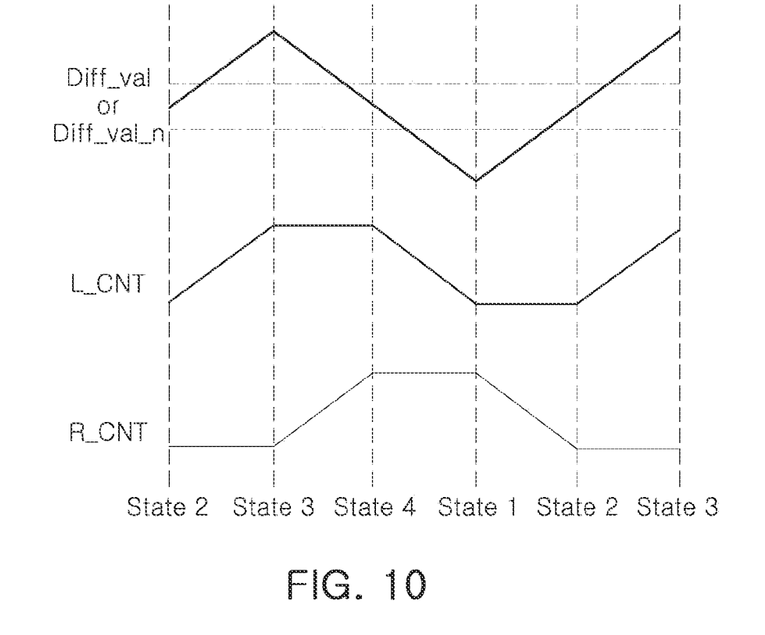

FIG. 10 corresponds to an example in which a rotation angle is calculated by 2 (=7.5/7.5*2) comparison values, when a size of a sensing coil corresponds to 7.5 degrees, a size of a pattern corresponds to 15 degrees, and a target sensing angle is 7.5 degrees.

Table 4 illustrates 2 comparison values normalized to 10 bit, when a maximum value and a minimum value of a difference value are normalized to 10 bit, a division range, that is, a region divided by the 2 comparison values, and an angle (a degree) measured by the 2 comparison values, among sizes of a pattern corresponding to 15 degrees.

TABLE 4

| Comparison value | 10-bit code value | Division range | Degree |
|---|---|---|---|
| 1 | 255 | 1/4 range | 3.75 |
| 2 | 767 | 3/4 range | 11.25 |

Figure 11:
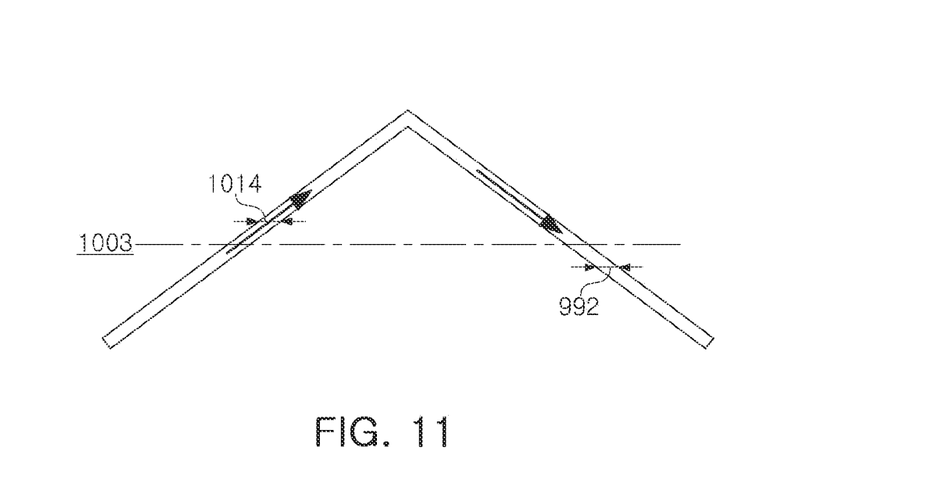
FIG. 11 is a diagram illustrating an example to illustrate hysteresis.

FIG. 11 is a diagram illustrating an example of hysteresis.

Referring to Table 1 and FIG. 11, a 24-th comparison value has a digital level of 1003. When the difference value and the 24-th comparison value are compared with each other and the difference value is continuously oscillated by a noise, or the like, in the vicinity of the 24-th comparison value, a rotation angle of a rotating body could not be precisely detected due to an incorrect output value.

However, as illustrated in FIG. 11, when a value, in which a reference value is added to the 24-th comparison value, is compared with a difference value in an increasing state of the difference value, and a value, in which a reference value is subtracted from the 24-th comparison value, is compared with the difference value in a decreasing state of the difference value, a rotation angle is precisely measured.

Thus, even when the target sensing angle is changed, or a size of a sensing coil/pattern is changed, a plurality of comparison values are calculated according to a determined target sensing angle, and a size of a sensing coil/pattern, and the calculated comparison value and a difference value are compared with each other. Thus, a target sensing angle is accurately detected.

As set forth above, minute displacement of the rotating body may be precisely detected from a change in frequencies of an oscillation signal.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing a rotating body, comprising:
a unit to be detected comprising a first pattern portion having at least one first pattern and a second pattern portion having at least one second pattern, and configured to rotate around a rotating shaft;
a sensor module comprising a first sensor disposed opposite to the first pattern portion and a second sensor disposed opposite to the second pattern portion; and
a rotation information calculator configured to calculate a difference value by differentiating output signals of the first sensor and the second sensor, and to compare comparison values, determined according to a target sensing angle and a size of the first pattern and the second pattern, with the difference value.

2. The apparatus for sensing a rotating body of claim 1, wherein the rotation information calculator is further configured to vary a number and a level of the comparison values according to the target sensing angle.

3. The apparatus for sensing a rotating body of claim 2, wherein the number of the comparison values is determined according to a ratio of an angle, corresponding to a size of the first pattern and the second pattern, and the target sensing angle.

4. The apparatus for sensing a rotating body of claim 3, wherein the level of the comparison values is determined to divide the angle, corresponding to the size of the first pattern and the second pattern, by the target sensing angle.

5. The apparatus for sensing a rotating body of claim 1, wherein the at least one first pattern and the at least one second pattern are arranged to have an angle difference.

6. The apparatus for sensing a rotating body of claim 1, wherein the comparison values are within a range of a maximum value and a minimum value of the difference value.

7. The apparatus for sensing a rotating body of claim 6, wherein a difference between two adjacent comparison values, among the comparison values, corresponds to twice a difference between a maximum comparison value, adjacent to the maximum value, and the maximum value, or a difference between a minimum comparison value, adjacent to the minimum value, and the minimum value.

8. The apparatus for sensing a rotating body of claim 5, wherein the at least one first pattern and the at least one second pattern have an angle difference corresponding to half of a size of the first pattern and the second pattern.

9. The apparatus for sensing a rotating body of claim 1, wherein the first sensor and the second sensor have a size corresponding to half of a size of the first pattern and the second pattern.

10. The apparatus for sensing a rotating body of claim 1, wherein the first sensor is configured to output a first output signal based on an area of the first sensor that is overlapped with the at least one first pattern portion,
the second sensor is configured to output a second output signal based on an area of the second sensor that is overlapped with the at least one second pattern portion, and
the rotation information calculator is configured to calculate the difference value by differentiating the first output signal and the second output signal.

11. An apparatus for sensing a rotating body, comprising:
a unit to be detected comprising a first pattern portion having at least one first pattern and a second pattern portion having at least one second pattern, and configured to rotate around a rotating shaft;
a sensor module comprising a first sensor disposed opposite to the first pattern portion and a second sensor disposed opposite to the second pattern portion; and
a rotation information calculator configured to calculate a difference value by differentiating output signals of the first sensor and the second sensor, and to compare comparison values, varied according to a target sensing angle, with the difference value.

12. The apparatus for sensing a rotating body of claim 11, wherein the rotation information calculator is further configured to determine a number and a level of the comparison values according to the target sensing angle.

13. The apparatus for sensing a rotating body of claim 12, wherein the number of the comparison values is determined according to a ratio of an angle, corresponding to a size of the first pattern and the second pattern, and the target sensing angle.

14. The apparatus for sensing a rotating body of claim 12, wherein the level of the comparison values is determined to divide an angle, corresponding to a size of the first pattern and the second pattern, by the target sensing angle.

15. The apparatus for sensing a rotating body of claim 11, wherein the rotation information calculator is further configured to compare the difference value with the comparison values to calculate an output value, and
   the output value is switched between states at a high level and a low level, at a time point at which a level of the difference value is equal to a level of each of the comparison values.

16. The apparatus for sensing a rotating body of claim 15, wherein a reference value having a different sign is applied to each of the comparison values, according to increasing and decreasing states of the difference value.

17. The apparatus for sensing a rotating body of claim 16, wherein a reference value having a positive sign is applied to any one comparison value among the comparison values, in an increasing state of the difference value, and a reference value having a negative sign is applied to the any one comparison value in a decreasing state of the difference value.

* * * * *